United States Patent [19]

Caesar

[11] 4,316,728
[45] * Feb. 23, 1982

[54] ENTRAINMENT SEPARATOR

[75] Inventor: Michael B. Caesar, Lake City, Fla.

[73] Assignee: Occidental Research Corporation, Irvine, Calif.

[ * ] Notice: The portion of the term of this patent subsequent to Aug. 14, 1996, has been disclaimed.

[21] Appl. No.: 176,377

[22] Filed: Aug. 8, 1980

Related U.S. Application Data

[63] Continuation-in-part of Ser. No. 909,895, May 26, 1978, abandoned, and Ser. No. 909,898, May 26, 1978, Pat. No. 4,164,398, and a continuation of Ser. No. 44,376, Jun. 1, 1979, abandoned.

[51] Int. Cl.³ .............................................. B01D 45/10
[52] U.S. Cl. ....................................... 55/226; 55/240; 55/242; 55/355; 261/DIG. 54
[58] Field of Search ................. 55/186, 223, 226, 240, 55/241, 242, 244, 355; 261/DIG. 54, DIG. 56, DIG. 9, 116

[56] References Cited

U.S. PATENT DOCUMENTS

| | | | |
|---|---|---|---|
| 1,970,783 | 8/1934 | Walker | 55/186 |
| 2,489,370 | 11/1949 | Fowler | 55/186 |
| 3,317,197 | 5/1967 | Lohner et al. | 261/DIG. 54 |
| 3,406,499 | 10/1968 | Wiemer | 261/DIG. 54 |
| 3,699,748 | 10/1972 | Barkovitz | 55/223 |
| 3,750,375 | 8/1973 | Wintrell | 261/DIG. 54 |
| 3,802,161 | 4/1974 | Talbert | 55/226 |
| 3,820,307 | 6/1974 | Havsberg et al. | 55/226 |
| 3,877,488 | 4/1975 | Batsray et al. | 261/DIG. 54 |
| 3,988,421 | 10/1976 | Rinaldi | 261/DIG. 54 |
| 3,994,705 | 11/1976 | Przewalski | 55/226 |
| 4,057,602 | 11/1977 | Kolm | 55/226 |
| 4,144,041 | 3/1979 | Hou | 55/226 |
| 4,164,398 | 8/1979 | Caesar | 55/186 |

Primary Examiner—Gregory N. Clements
Attorney, Agent, or Firm—Walter A. Hackler

[57] ABSTRACT

An entrainment separator for separating entrained liquids or solids from a gas includes a housing having an inlet and a first outlet disposed in opposite ends therein and a second outlet disposed in said housing intermediate said inlet and first outlet. Gas with entrained liquids or gases introduced into the housing through the inlet and is intercepted by a first surface onto which the liquids or solids impinge. An annular deflector and the first surface and toward a tube disposed within the housing and extending away from the second surface opposite said first surface. Means is provided for varying the size of the opening between the deflector and the first surface, and a funnel is provided for conducting flow of the liquids or solids, separated from the gas, into the first outlet. The second outlet enables withdrawal of gas which is substantially free of entrained liquids and solids.

7 Claims, 5 Drawing Figures

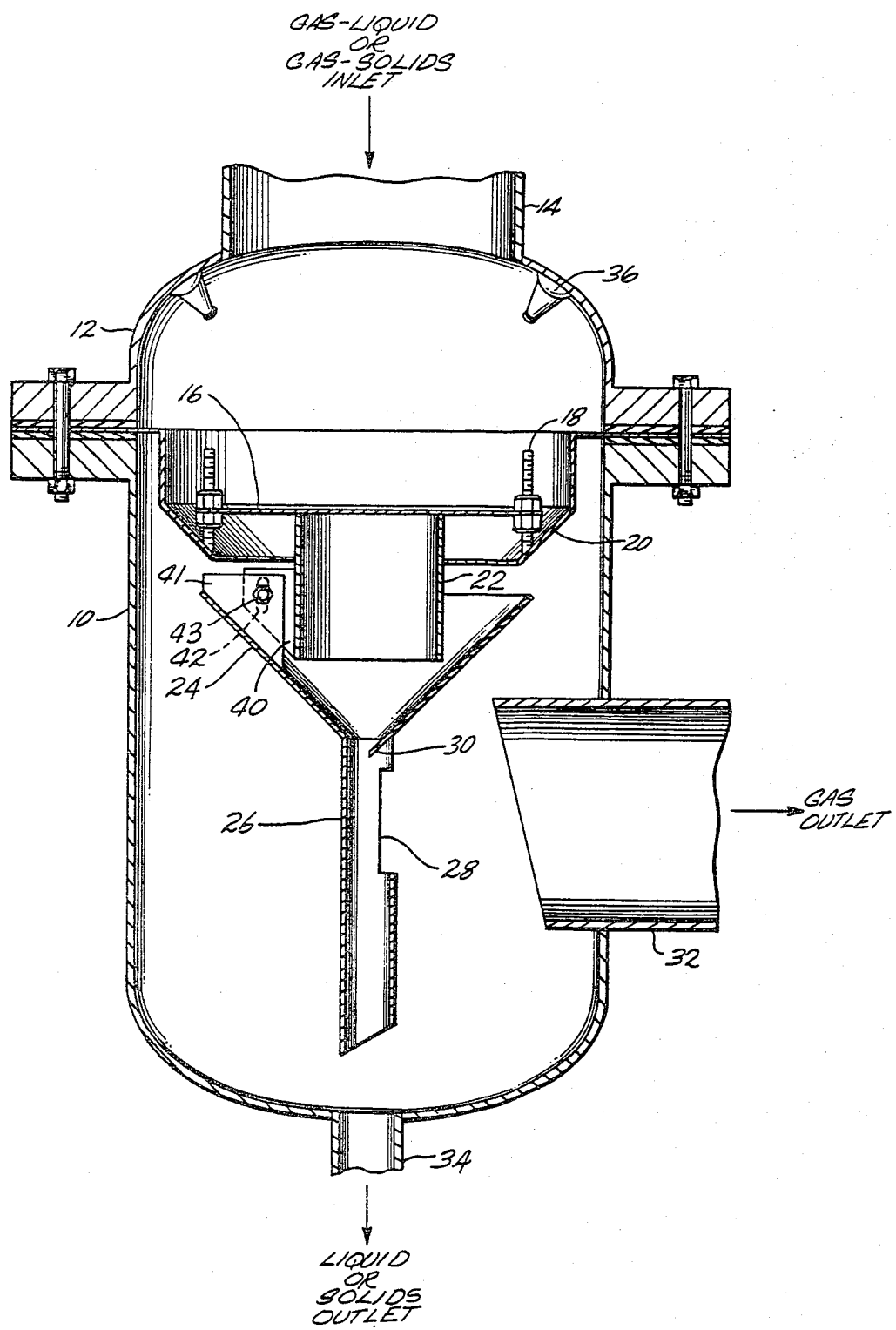

ENTRAINMENT SEPARATOR

This application is a continuation-in-part of applications Ser. Nos. 909,895 ABN and 909,898, now U.S. Pat. No. 4,164,398 both filed May 26, 1978.

This application is a continuation, of application Ser. No. 044,376, filed June 1, 1979, ABN.

BACKGROUND OF THE INVENTION

The present invention relates to an entrainment separator. More particularly, it relates to an entrainment separator for the separation of entrained solids or liquids from gases, preferably entrained liquids. It also relates to a contactor-separator whereby a mist or drops of a liquid can be contacted with the gaseous stream to further remove entrained liquids, solids and/or soluble or reactive components of the gaseous stream (e.g. $SO_2$ removal by a caustic wash.)

It has been well known that dispersions of liquids in gases and gases in liquids are always fundamentally unstable mixtures. Left to themselves, they will generally separate into massive collections of the component phases. In many instances, however, such natural separation occurs over a long period of time. For industrial uses and independent of origin of the dispersion, whether intentional or inadvertent, the gas-liquid dispersions generally are always ultimately separated. The separation may consist merely of removal of the aggregated and collected phases, or it may involve aggregation and collection as well as removal. Often the rate at which the process of separation would occur naturally is slow and uneconomical. In such cases the separation operation may be enhanced by the artificial acceleration of the natural process.

There are many reasons why gas-liquid dispersions should be separated. The quality of a process stream or of a product can suffer unless adulterating material in the form of another dispersed phase is removed. The efficiency of staged mass transfer operations can be reduced if there is mechanical carryover of a dispersed phase with the continuous stream from one stage to the next. Valuable material can be lost from a system because of incomplete separation of dispersed material. With improper separation of the gas-liquid dispersion, there can be intrusion of an unwanted phase into equipment along the line of processing which may result in poor performance or damage to the equipment. A discharge of a gas-liquid dispersion from a stack can result in atmospheric pollution and possible destruction of property.

Many methods are employed to separate gas-liquid dispersion systems. Such methods include: gravitational, inertial, absorption, dilution, physiochemical, electrical, and thermal. Often more than one method is effective and the methods may be combined for synergistic effect. Many separators employing the above systems and procedures are the product of invention or accumulated experience and have never been completely described scientifically. Many such methods and apparatus for separating entrained liquids from gases are designed specifically for the conditions peculiar to a given gas-liquid dispersion system and the mechanical apparatus also peculiar to that system.

SUMMARY OF THE INVENTION

In accordance with this invention, there is disclosed a device in the form of an entrainment separator for separating liquids from gases and solids from gases comprising:

A housing having inlet means for introducing a flow of gas into said housing, first outlet means for withdrawing liquids and solids, separated from said gas, from said housing, and second outlet means for withdrawing gas, substantially free of entrained liquids and solids, from said housing, said inlet means and said first outlet means being disposed in said housing intermediate said inlet and first outlet means;

a member having means defining a first surface for intercepting the flow of gas introduced by the inlet means and a second surface opposite said first surface;

a tube disposed within said housing and extending away from the second surface member;

annular deflector means disposed adjacent to said first surface and positioned to provide an opening therebetween, said deflector means being operative for directing the gas flow toward said tube;

means for adjusting the position of the member relative to the annular deflector means, thereby varying the size of said opening; and, funnel means at least partly surrounding said tube for conducting flow of liquids and solids separated from the gas introduced into the housing into said second outlet means.

The advantages of the invention include the following: 1. The adjustment feature allows a wide turndown ratio, even during operation if the external adjustment is included. 2. Easily cleaned after removal of internals. 3. Small positive flow of gas assists in keeping the separated liquid or gas particles moving toward the drain outlet. 4. In the (favored) downward flow configuration the direction of gas flow assists the gravitational drainage down the wall of the impingement cylinder and prevents reentrainment. 5. The cylindrical configuration of the housing is the least expensive for pressure or vacuum application, and is well suited for lining against corrosion, erosion, etc. 6. The housing can be fabricated from standard piping or vessel sections, while the internals can be sized for particular applications.

DRAWINGS

These and other features and advantages of the present invention will be appreciated as the same becomes better understood by reference to the following detailed description and accompanying drawings, wherein:

FIG. 5 is a longitudinal cross sectional view through a preferred embodiment of a entrainment separator of the invention.

DETAILED DESCRIPTION

Figure 1:
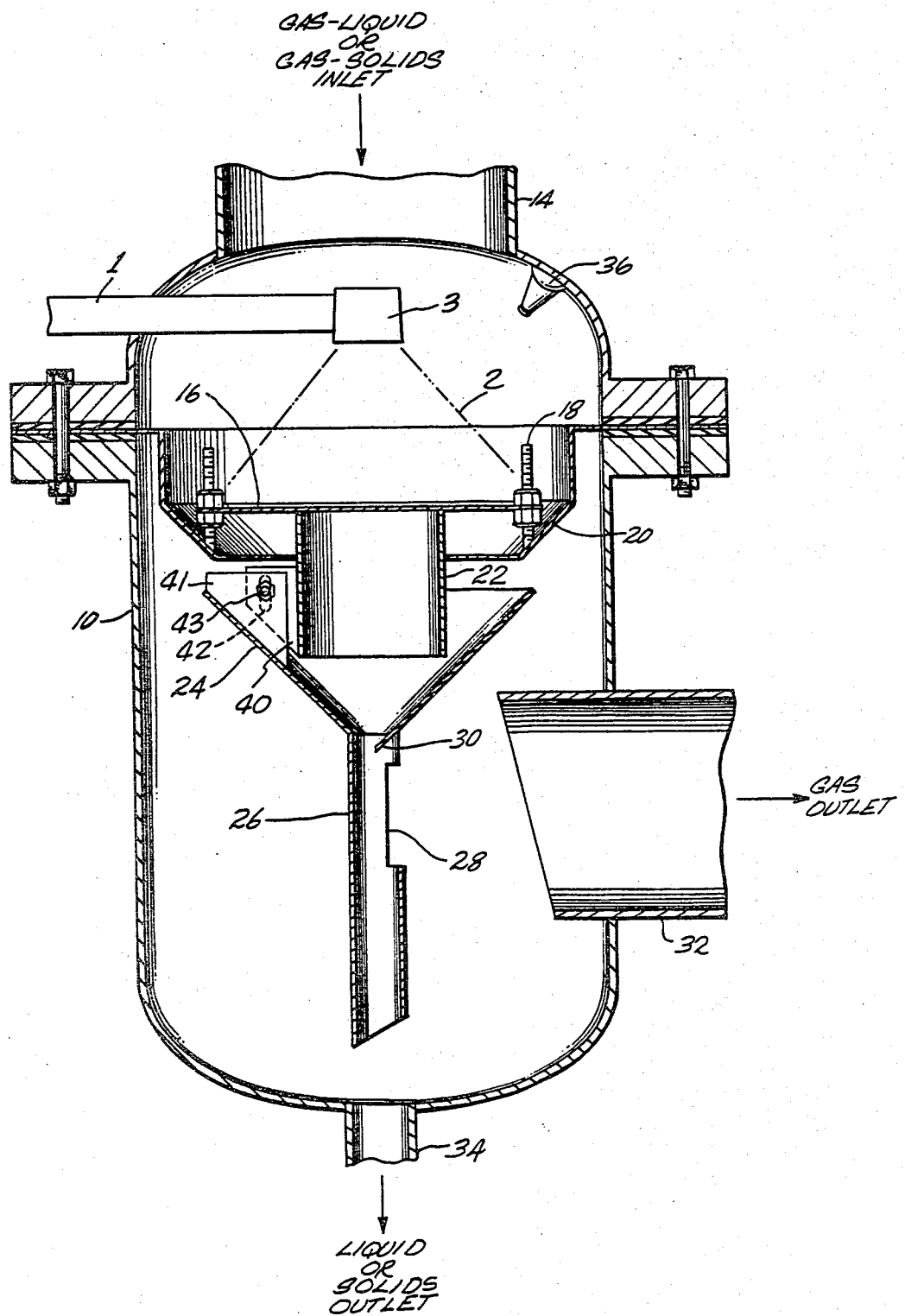
FIGS. 1, 2 and 3 are longitudinal cross-sectional views through preferred embodiments of a contactor according to the invention.

With reference particularly to FIG. 5 of the drawings, the entrainment separator thereof comprises a housing 10. Positioned on housing 10 is removable cover 12 having an inlet 14. Positioned directly below and in line with inlet 14 is planar surface 16 which forms a plane perpendicular to the plane defined by the sides of inlet 14. Planar surface 16 has a face directed toward inlet 14 and an opposed face. Planar surface 16 is positioned in proximity to and lying within a concave cavity formed by annular deflector 20 of frusto-conical shape and which is attached to housing 10. Annular deflector 20 attached to housing 10 extends, generally, downward and inward of the housing. The slope inward of annular deflector 20 is from about 15° to about 75° from vertical. It is preferred that the annular deflector have an inward slope of from about 30° to about 60°. Planar surface 16 has adjustment means 18 by which the position of the planar surface is adjusted in relation to annular deflector 20. An opening between planar surface 16 and annular deflector 20 is defined by the edge of the planar surface 16 and annular deflector 20. By adjusting the adjustment means 18, the width of the opening is correspondingly adjusted.

Attached to the opposed face of planar surface 16 is tube 22. The sides of tube 22 are perpendicular to the plane of planar surface 16. Tube 22 extends downward from planar surfaces 16 into the mouth of funnel 24 lying directly below planar surface 16. Funnel 24 has a spout 26 extending downward toward the bottom of housing 10. Lying below spout 26 is a liquid or solids outlet 34. Spout 26 can have a lateral gas exhaust port 28. If spout 26 has a gas port 28, shield 30 is provided and positioned directly above gas port 28 and attached to funnel 24 to prevent liquid or solids from flowing through the opening. A gas outlet 32 is positioned on the side of housing 10, directly facing and in line with gas port 28. The entrainment separator of this invention is designed to separate liquids and solids from the gas in which they are entrained. Although the separator of the invention can be used to separate solid particles from gases, it is particularly suited to separate liquids from gases. It is preferable that the entrainment separator for separating solids from gases have washing means 36 for washing the solids, disengaged from the gas, from the surfaces on which they accumulate. Such washing means include a spray or series of spray nozzles, ring sprayers and the like.

The description of the entrainment separator will be better understood by the following discussion of the flow of gas-liquid dispersion therethrough.

The gas-liquid dispersion to be separated enters in a downward flow into the entrainment separator housing 10 through inlet 14 located on cover 12. Cover 12 can be either fixed or removable. It has been found to be preferred to have the cover removable to facilitate inspection, cleaning, adjustment or repair of the separator.

The downward flowing gas-liquid dispersion strikes planar surface 16 which lies directly in the path of the dispersion flow. The planar surface diverts the flow of gas but the liquid entrained in the dispersion is impinged on the planar surface. The entrained liquid droplets in the dispersion are carried toward the planar surface by their large downward flowing momentum relative to the gas flow and the liquid droplets thereby impinge upon the planar surface. The gas continues to flow around the edges of the planar surface striking annular deflector 20. The annular deflector directs the gas through the opening between the planar surface and the annular deflector. Any liquid which remained in the gas after striking the planar surface is impinged onto the surface of the annular deflector. The gas passing through the opening between the planar surface and annular deflector is directed by the annular deflector into the sides of tube 22. Any liquid which still remains in the gas may also impinge or disengage from the gas by centrifugal force onto the surface of tube 22. The gas flow substantially continues around tube 22 toward gas outlet 32. However, some gas will strike funnel 24. Any liquid remaining in the gas striking the funnel can be impinged on the surface thereof. The flow of substantially liquid-free gas from the funnel and the tube continues due to the gas pressure striking the side of the housing whereupon remaining liquid is impinged or disengaged from the gas by centrifugal force and the gas then flows through gas-outlet 32 located on the side of housing 10.

Tube 22 has a plurality (e.g., 3 or 4) of slotted lug members (one of which 40 is shown in the figure) which corresponds with slotted lugs 41 on the cone 24 and permits vertical adjustment of the gap between cylinder 22 and cone 24. The adjustment is made such that the disengaged liquid can flow down cone 24 but not so great as to permit excess flow of air downward. The slots are shown as 42 in the figure. Clamping is achieved by bolt and nut, 43.

It is preferred that the gas-outlet 32 extend into the housing 10 to prevent re-entrainment of the liquid that collect on the interior wall of the housing as it flows down the wall toward the liquid outlet.

The flow of gas and the velocity thereof can be controlled by the adjustment means 18 located on planar surface 16. As recited above, the adjustment means positions planar surface 16 relative to annular deflector 20 and thereby controls the width of the opening between the planar surface and the annular deflector. The planar surface lies within the concave cavity of the annular deflector. By raising or lowering the planar surface, the opening is correspondingly widened or narrowed. Any convenient adjustment means can be used to adjust the planar surface such as bolt and nut, bolt with threaded aperture in the planar surface, slide fastener, and the like.

The liquid impinged on planar surface 16 collects on the surface until droplets of sufficient size are formed such that they begin to run off the planar surface. The drops of liquid fall off the edge of the planar surface striking annular deflector 20. The liquid flows down the annular deflector. The inner and lower edge of the annular deflector extends inward of housing 10 and over the mouth of funnel 24 lying below. The liquid that has run off the planar surface flows down the annular deflector collecting any liquid impinged thereon and drops into funnel 24. Liquid that is impinged on tube 22 likewise drops into funnel 24. Funnel 24 can be attached to the housing or can be attached to tube 22. Preferably, funnel 24 is attached to the tube or housing in such a manner that it can be readily removed to facilitate cleaning. It is preferred that the funnel be attached to the tube such that a gap of from about $\frac{1}{8}$ to about $\frac{1}{4}$ inches is formed between the funnel and tube. Alternatively, the funnel can be attached to the lower end of the tube with slots provided in the tube to enable liquid to flow from the funnel to the spout. More preferably, the means of attachment of the funnel to the tube are adjustable to vary the gap within the desired range of about $\frac{3}{8}$ to $\frac{1}{4}$ inches. The liquid collected in funnel 24 flows down spout 26 and drops out of the top of the spout into liquid outlet 34 and out of housing 10 of the separator. Any liquid impinged on the side of the housing or outlet 32 runs off the surface of the outlet, down the side of the housing and out liquid outlet 34.

Generally, the gas will not substantially flow through the funnel because of the constriction between the mouth and spout of the funnel and because the gas is free to flow upward out of the funnel. However, a gas exhaust port 28 can be provided in spout 26 of funnel 24 to allow any gas passing down the spout a passageway out of the funnel. The gas port allows the gas to pass out of the spout rather than pass through the narrow spout at the same time as the liquid. The gas port provides a pathway of least resistance for gas out of the spout. The passage of the liquid down the spout is also enhanced by the availability of gas pot 28. From gas port 28, the gas can flow directly to the gas outlet 32. Liquid is prevented from flowing out of the gas port by a shield 30 positioned over the gas port. The shield directs the flow of liquid away from the gas port. In the braodest sense, this device is a separator, and with means provided for adding a liquid mist or droplets, e.g. as when a spray boom and nozzle are inserted in the inlet, is a contactor/separator.

Thus, referring to FIG. 1, positioned above the adjustable surface 16, and below the inlet 14, is a spray boom 1 which can introduce a spray of liquid droplets or a mist which can provide intimate contact of a wash liquid, (e.g., water) or a reagent (e.g., aqueous base to react with acidic gases) with the fluid entering through the inlet 14.

The spray-head 3 could be directed upward toward the inelt 14 or, as illustrated, toward the adjustable surface 16. It will be noted that the surface washing means 36 are to be distinguished from the means 1 of introducing a spray or mist to the interior of the upper volume of the device, thus permitting efficient contact of the spray or mist with a fluid stream comprising gases containing entrained solids and/or liquids.

Figure 3:
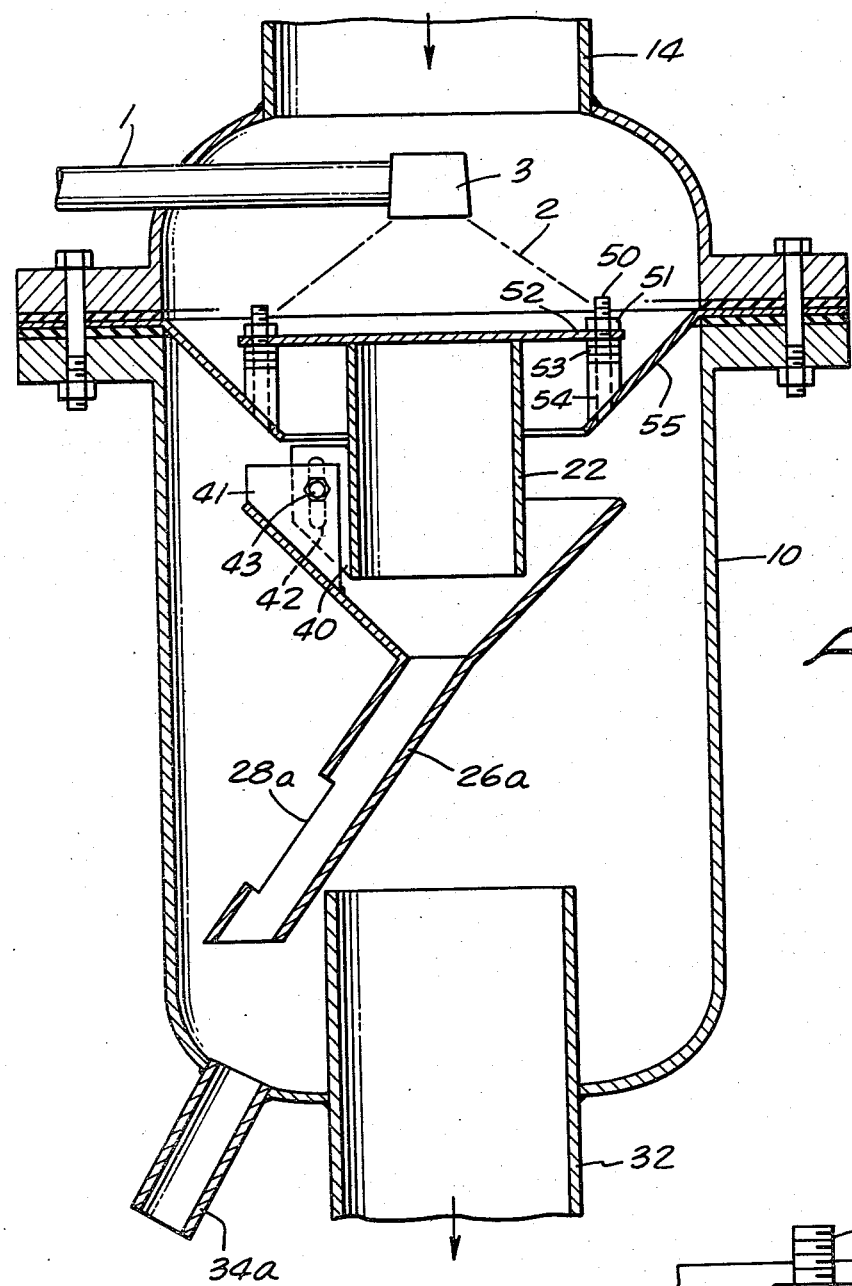
Figure 4:
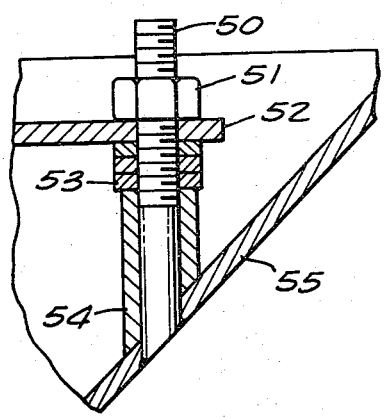
FIG. 4 is a detail of a preferred adjustment means employed in FIG. 3.

Many arrangements of the basic design are possible, to fit in with a total system design e.g., 1. vertical (downwards) gas outlet, with the liquid drain and funnel drain skewed (see FIG. 3). Thus, referring to FIG. 3, the funnel spout or drain 26a containing the gas exhaust port 28a, and liquid outlet or drain 34a, are skewed, and the gas outlet 32 is located at the bottom of housing 10. In FIGS. 3 and 4, the adjustment means for positioning the planar surface 52 with respect to the annular deflector 55 includes a plurality of units each comprising a bolt 50 and nut 51, the bolt being received within a sleeve 54 mounted on the deflector 55, with washers 53 positioned between the end of the sleeve and the lower face of planar surface 52. 2. it is possible to design for vertical upward inlet, with the top gas outlet either vertical or horizontal. In this configuration, the gravity flow tube from the funnel would need to be sealed into the liquid solid outlet nozzle and not have a gas port. The internals should be different from the downflow design.

Other changes from the original basic design include:
1. Omitting the vertical step below the main flange as noted earlier, if sideways removal of the top housing is not necessary. This also shortens the housing.
2. Extending the adjusting bolts (item 18) for the planar surface 16 out through the top of the upper housing, to permit adjustment while in operation. Thus, referring to FIG. 2, the adjustment bolts 18 are each supported on a threaded flange 18a mounted on inlet 14, with an adjusting nut 18c on rod 18, positioned between a washer 18b abutting flange 18a, and a threaded collar 18d mounted on a shoulder on the cover of the unit. This requires the planar surfce to be separate from the other internals (see FIG. 2) and the impingement cylinder (tem 22) would be attached to the cone (item 24) at 22a with drainage slots 22b at the base.
3. Extending the inlet pipe (14) into the top housing so that its clearance above the planar surface gives a much higher velocity than at present. This would limit the adjustment of the planar surface.
4. Install a hollow cone nozzle, e.g. at 3 in spray boom 1, in FIGS. 1, 2 and 3, to provide a continuous spray of liquid. This would make the equipment into a contactor/separator for such uses as scrubbing, humidifying, desuperheating.

The contactor-separator can also function as a mist-type chemical reactor; see the U.S. Pat. Nos. of Jaydee W. Miller, 3,717,686 3,780,130 and 3,914,615.

ILLUSTRATIVE EXAMPLE

The invention is further illustrated by the following detail of an operative entrainment unit, which was designed to protect a vacuum pump used in the system of U.S. Pat. Nos. 4,132,760, issued Jan. 2, 1979, and 4,140,748, issued Feb. 20, 1979, from acid entrainment. The gas load through the system (design) was about 550 lbs/hr. of air, about 650 lbs/hr. $CO_2$, saturated, plus acid entrainment from pondwater. Operating pressure was between 10 and 20 inches of mercury, absolute, temperature was 70°–105° F. The liquid drain was sealed into a hot well by a full vacuum leg.

An entrainment separator, as in FIG. 5, for separating liquids from gases was constructed having an overall height of 3 feet, 6-$\frac{3}{8}$ inches and a diamter of 1 foot, 2 inches. The base portion of the housing for the separator was 2 feet, $\frac{3}{8}$ inches in height. A removable cover 1 foot, 6 inches high fits on top of the base portion of the housing. The removable cover was fitted with means for securely fastening the cover onto the base portion of the housing.

An 8 inch diameter gas-liquid dispersion inlet was provided on top of the removable cover. Below the inlet was a 10 inch in diameter circular planar surface with one side thereof directed toward the inlet. The planar surface was positioned within the concave cavity created by an annular deflector. The annular deflector had an inward slope of 45° and had an opening at the bottom thereof of 9 inches in diameter. The planar surface was fitted with three adjustement means each including a bolt and two nuts, to position the planar surface above the annular deflector. By adjusting the nuts on the bolts, the planar surface could be raised or lowered.

Attached to the bottom side of the planar surface was a 4 inch diameter tube, approximately 6 inches long. The tube was fastened perpendicular to the planar surface and extended downward therefrom toward a funnel. The funnel was attached to the tube such that a gap of from about $\frac{1}{8}$ to about $\frac{1}{4}$ inches was formed between the tube and funnel. The funnel mouth had a 10 inches in diameter opening and narrowed to an outlet and spout of 1-$\frac{1}{2}$ inches in diameter. The tube extended approximately 2-$\frac{1}{2}$ inches down into the mouth of the funnel. The funnel had a downward slope of about 45°. The spout on the funnel was 9 inches long and the tip of the spout was cut on a 30° bias. The spout was positioned over a 1-$\frac{1}{2}$ inch diameter outlet, 4 inches long on the bottom of the separator.

Along the spout of the funnel was a gas port approximately $\frac{1}{8}$ to $\frac{3}{8}$ inches deep and 3 inches down the spout. Positioned over the gas port was a shield approximately 1 inch long and at a downward slope of 45°. Across from the gas port was a gas outlet 6 inches in diameter, and approximately 9 inches long at the bottom, centered 13 inches up from the bottom of the separator and extending 6 inches from the side of the housing of the separator and extending about 3 inches at the top into the housing.

The plant entrainment separator was not inspected or adjusted after being received from the fabricator and placed in service. The plant was on stream for approximately 70 days. There was not sign of scale or corrosion in the separator.

The vertical step down from the main support flange is a means to lower the bolts below the main flange to allow the top housing to be slid off sideways—a convenience for cleaning access. Access to the securing bolts for the lower funnel is difficult. The bolting lugs should come a little higher above the funnel. The top plate ("adjustable planar surface") should be of heavy gauge material so that it will not warp. Spacers should be fitted over the bolts under the planar surface, in place of the existing nuts, to give uniform adjustment of the planar surface. There were no problems with acidity in the vacuum pump seal water, which this equipment is designed to protect. In normal operation the flow of disengaged liquid from the separator was less than about 2 gallons per hour. However, in one instance when the scrubber ahead of the separator was flooded, the flow of disengaged liquid from the separator was 12–24 gallons per hour and the vacuum pump remained adequately protected.

Figure 2:
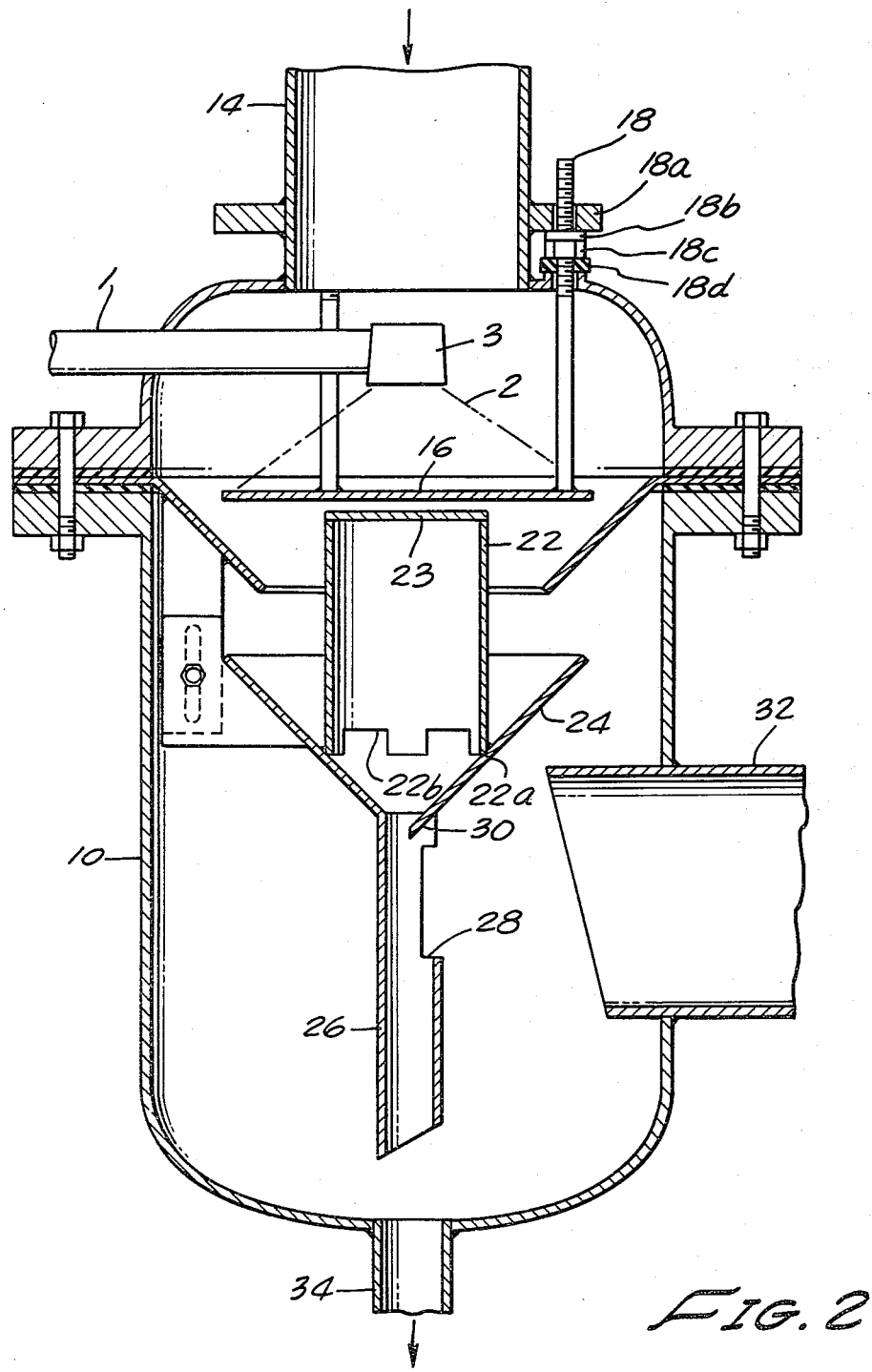

To convert this entrainment separator to a contactor-separator a spray-boom can be installed above the adjustable surface (as illustrated in FIG. 1), thus permitting washing the gaseous stream with clean water (or other solvent or reagent) to further remove soluble materials from the gas.

The subject invention, particularly when utilized as an entrainment separator or demister, can be used in any process where there is a sufficient available pressure drop (usually at least about ½ psi). That is, it is preferably used where there is a light to moderate vacuum, in contrast to very high vacuum. It can also be useful in a pressurized system, and in fact, it can be used at very high pressures (such as are encountered in hydrorefining or hydrogenation of petroleum oils). In general, the apparatus can be used in any process where there is a liquid phase reaction in a vessel where a gas is evolved, or used as a reactant. For example, it is useful in a process where hydrogen is manufactured, such as, reforming or in the reaction of ores with an acid, such as digestion of zinc ores with sulfuric acid. It is also useful in fermentation processes, such as in breweries where carbon dioxide is evolved.

A special advantage of this invention is that it is to a great extent self-cleaning or, when cleaning is required, it is much more easy to clean than such devices as the Anderson separator which utilizes a cylinder containing numerous slots which can plug up and require rodding out.

In one instance, in an operation when an entrainment separator of the present invention was placed between a scrubber and a vacuum pump, plastic (polypropylene) packing saddles were dislodged from the scrubber and collected on the top of the separator (or demister). This caused a considerable pressure drop in the separator and solids from the packing collected on the top plate. The separator fully protected the vacuum pump. When the process was shut down for cleaning, the packing and collected solids were readily cleaned out.

What is claimed is:

1. A device for separating entrained liquids and solids from a gas comprising:
(a) housing having inlet means for introducing a flow of gas having entrained liquids and solids therein, into said housing, first outlet means for withdrawing liquids and solids, separated from said gas, from said housing, and second outlet means for withdrawing gas, substantially free of entrained liquids and solids, from said housing, said inlet means and said first outlet means being disposed in opposite ends of said housing, said second outlet means being disposed in said housing intermediate said inlet and first outlet means;
(b) a member having means defining a first surface for intercepting the flow of gas introduced by the inlet means and a second surface opposite said first surface;
(c) a tube disposed within said housing and extending away from the second surface;
(d) annular deflector means disposed adjacent to said member first surface and positioned to provide an opening therebetween, said deflector means being operative for directing the gas flow toward said tube;
(e) means for adjusting the position of the member relative to the annular deflector means, thereby varying the size of said opening; and
(f) funnel means at least partly surrounding said tube for conducting flow of liquids and solids separated from the gas introduced into the housing into said second outlet means.

2. The device of claim 1 wherein the housing includes a removable cover and the inlet means is disposed in said removable cover.

3. The device of claim 2 further including flange means for both attaching said removable cover to an end of said housing and for supporting said annular deflector means within the housing.

4. The device of claim 1 wherein said tube is attached to the funnel means and is adapted to permit flow of liquids and solids, separated from said gas, through said funnel means.

5. The device of claim 1 wherein said second outlet means includes a pipe extending through a side wall of the housing.

6. The device of claim 1, wherein the funnel means includes a downwardly extending spout, said spout having a lateral gas port therein and said device further comprises shield means attached to the interior of the funnel means for directing flow of liquids and solids away from the gas port.

7. The device of claim 1 further comprising means for washing interior portions of the device upon which liquids and solids may accumulate.

* * * * *